(12) United States Patent
Klaußner et al.

(10) Patent No.: US 11,865,770 B2
(45) Date of Patent: Jan. 9, 2024

(54) METHOD FOR CALIBRATING AN IRRADIATION DEVICE

(71) Applicant: CONCEPT LASER GMBH, Lichtenfels (DE)

(72) Inventors: Tim Klaußner, Kronach (DE); Christian Dicken, Weidenberg (DE); Bertram Gärber, Neustadt (DE)

(73) Assignee: CONCEPT LASER GMBH, Lichtenfels (DE)

( * ) Notice: Subject to any disclaimer, the term of this patent is extended or adjusted under 35 U.S.C. 154(b) by 937 days.

(21) Appl. No.: 16/291,666

(22) Filed: Mar. 4, 2019

(65) Prior Publication Data
US 2020/0086557 A1 Mar. 19, 2020

(30) Foreign Application Priority Data
Sep. 19, 2018 (EP) .................................... 18195570

(51) Int. Cl.
*B29C 64/153* (2017.01)
*B29C 64/135* (2017.01)
(Continued)

(52) U.S. Cl.
CPC ............ *B29C 64/153* (2017.08); *B23K 26/04* (2013.01); *B23K 26/32* (2013.01); *B29C 64/135* (2017.08)

(58) Field of Classification Search
CPC ..... B29C 64/393; B29C 64/386; B29C 64/20; B29C 64/364; B29C 64/268; B29C 64/286; B29C 64/30
See application file for complete search history.

(56) References Cited

U.S. PATENT DOCUMENTS 10,850,326 B2   12/2020   Ashton et al.
10,882,256 B1   1/2021   Thiel
(Continued)

FOREIGN PATENT DOCUMENTS

EP        3351323 A1      7/2018
WO    WO2017/118569 A1    7/2017
(Continued)

OTHER PUBLICATIONS

European Search Report Corresponding to EP18195570.9 dated Feb. 27, 2019.

*Primary Examiner* — Seyed Masoud Malekzadeh
*Assistant Examiner* — Tiffany Yu Huang
(74) *Attorney, Agent, or Firm* — Dority & Manning, P.A.

(57) ABSTRACT

Method for calibrating an irradiation device (2) for additively manufacturing three-dimensional objects which irradiation device (2) comprises at least two irradiation units (3, 4), comprising: guiding one of the at least two energy beams (6, 10) via the corresponding irradiation unit (3, 4) to a determination region (15), preferably a part of a build plane (8), for generating a calibration pattern (18, 19); imaging at least one part of the determination region (15) to an on-axis determination unit (12, 14) of the at least one other irradiation unit (3, 4); determining a position of the calibration pattern (18, 19) in the determination region (15) on basis of the image of the at least one part of the determination region (15); generating calibration information relating to a calibration status of at least one part of the irradiation device (2) based on the position of the calibration pattern (18, 19).

20 Claims, 4 Drawing Sheets

(51) Int. Cl.
*B23K 26/04* (2014.01)
*B23K 26/32* (2014.01)

(56) References Cited

U.S. PATENT DOCUMENTS

| | | |
|---|---|---|
| 2010/0292947 A1 | 11/2010 | Buk |
| 2015/0321426 A1 | 11/2015 | Lee et al. |
| 2016/0082668 A1* | 3/2016 | Perret .................... B29C 64/153 |
| | | 425/135 |
| 2018/0093416 A1 | 4/2018 | Prexler et al. |
| 2018/0186067 A1 | 7/2018 | Buller et al. |
| 2018/0186082 A1* | 7/2018 | Randhawa ........... B23K 26/062 |
| 2018/0207750 A1 | 7/2018 | Carter |
| 2018/0354034 A1 | 12/2018 | Vaes et al. |
| 2018/0370146 A1 | 12/2018 | Domrose et al. |
| 2019/0118481 A1 | 4/2019 | Brown |
| 2019/0134747 A1 | 5/2019 | Herzog et al. |
| 2019/0255614 A1* | 8/2019 | Madigan ............... B23K 26/342 |
| 2020/0238625 A1* | 7/2020 | Champion ............ B29C 64/165 |
| 2021/0001559 A1* | 1/2021 | Thiel ..................... B29C 64/268 |

FOREIGN PATENT DOCUMENTS

| | | |
|---|---|---|
| WO | WO2017/174226 A1 | 10/2017 |
| WO | WO2017/187147 A1 | 11/2017 |

\* cited by examiner

METHOD FOR CALIBRATING AN IRRADIATION DEVICE

CROSS-REFERENCE TO RELATED APPLICATIONS

This application claims priority to European Patent Application serial no. 18 195 570.9 filed Sep. 19, 2018, the contents of which is incorporated herein by reference in its entirety as if set forth verbatim.

The invention relates to a method for calibrating an irradiation device of an apparatus for additively manufacturing three-dimensional objects by means of successive layerwise selective irradiation and consolidation of layers of a build material which can be consolidated by means of an energy beam, which irradiation device comprises at least two irradiation units, wherein a first irradiation unit is adapted to generate at least one first energy beam and guide the first energy beam via a first beam guiding unit in a first guiding region of a build plane, wherein a second irradiation unit is adapted to generate at least one second energy beam and guide the second energy beam via a second beam guiding unit in a second guiding region of a build plane.

Irradiation devices for apparatuses for additively manufacturing three-dimensional objects and methods for calibrating the same are generally known from prior art. Usually, an irradiation device is used to generate an energy beam with which build material arranged in the build plane can selectively be irradiated to successively layerwise build a three-dimensional object. Further, irradiation devices are known that comprise two or more irradiation units, wherein each irradiation unit is adapted to generate and guide an energy beam independent of the energy beams generated via the other irradiation units. Hence, it is possible to use such irradiation devices to irradiate large build planes, wherein the build plane may be subdivided into multiple guiding regions, for example a first guiding region and a second guiding region, wherein the first energy beam can be guided in the first guiding region and the second energy beam can be guided in the second guiding region.

It is further known from prior art that such guiding regions may at least partially overlap or maybe stitched to (abut) one another, wherein the individual irradiation units of the irradiation device may be calibrated in that the positions of irradiated features of the object may correspond in that parts of the object that are irradiated via the individual energy beams in individual guiding regions correspond to each other and together form the three-dimensional object. Otherwise, for example, if an error occurs and the position to which the individual energy beams are guided do not correspond, errors in the object may occur, such as stitching errors, i.e. deviations from a nominal positions and nominal object geometries.

For calibrating irradiation devices, it is known to use test specimen, such as metal sheets and arrange it in the process chamber, i.e. the chamber in which the additive manufacturing process is performed. Thus, it is possible to irradiate calibration patterns, for example lines, on the test specimen and verify, whether each irradiation unit is adapted to properly irradiate the calibration pattern, e.g. in the desired position. Hence, this calibration method requires the arrangement of the test specimen inside the process chamber, wherein a relation between the two or more irradiation units can only be established via the positions of the calibration patterns irradiated on the test specimen. Therefore, it is cumbersome and time-consuming to arrange the test specimen in the process chamber and to analyze the calibration patterns irradiated on the test specimen.

It is an object of the present invention to provide an improved method for calibrating an irradiation device, in particular a method for calibrating an irradiation device, wherein the relation between at least two irradiation units of the irradiation device can be established more efficiently.

The object is inventively achieved by an apparatus according to claim 1. Advantageous embodiments of the invention are subject to the dependent claims.

The method described herein is a method for calibrating an irradiation device of an apparatus for additively manufacturing three-dimensional objects, e.g. technical components, by means of successive selective layerwise consolidation of layers of a powdered build material ("build material") which can be consolidated by means of an energy source, e.g. an energy beam, in particular a laser beam or an electron beam. A respective build material can be a metal, ceramic or polymer powder. A respective energy beam can be a laser beam or an electron beam. A respective apparatus can be an apparatus in which an application of build material and a consolidation of build material is performed separately, such as a selective laser sintering apparatus, a selective laser melting apparatus or a selective electron beam melting apparatus, for instance.

The apparatus may comprise a number of functional units which are used during its operation. Exemplary functional units are a process chamber, an irradiation device, as described before, which is adapted to selectively irradiate a build material layer disposed in the process chamber with at least one energy beam, and a stream generating device which is adapted to generate a gaseous fluid stream at least partly streaming through the process chamber with given streaming properties, e.g. a given streaming profile, streaming velocity, etc. The gaseous fluid stream is capable of being charged with non-consolidated particulate build material, particularly smoke or smoke residues generated during operation of the apparatus, while streaming through the process chamber. The gaseous fluid stream is typically inert, i.e. typically a stream of an inert gas, e.g. argon, nitrogen, carbon dioxide, etc.

As described before, the invention relates to a method for calibrating an irradiation device with at least two irradiation units, in particular the irradiation device of an apparatus for additively manufacturing three-dimensional objects. The invention is based on the idea that one of the at least two energy beams is guided via the corresponding irradiation unit to a determination region, preferably a part of the build plane, for generating a calibration pattern. Hence, as also described before, the irradiation device comprises two or more irradiation units, wherein each irradiation unit is adapted to generate an energy beam that can be guided across the guiding region, for example a part of a build plane. Hence, one of the two irradiation units is used to generate the energy beam and guide the energy beam to a determination region and to generate a calibration pattern in the determination region. The determination region is preferably a part of the build plane. The calibration pattern can be any arbitrary pattern, e.g. a line or a dot, preferably the spot of the energy beam.

Further, at least one part of the determination region is imaged to an on-axis determination unit of the at least one other irradiation unit. Thus, one irradiation unit is used to guide an energy beam to the determination region and generate the calibration pattern in the determination region, whereas the at least one other irradiation unit is used, in particular the determination unit assigned to the other irradiation unit, to image or detect the at least one part of the determination region in which the calibration pattern is generated.

On basis of the image of the at least one part of the determination region it is possible to determine a position of the calibration pattern in the determination region. In other words, the position of the calibration pattern in the determination region can be determined based on the image of the at least one part of the determination region that was imaged to the on-axis determination unit of the at least one other irradiation unit. Therefore, it is possible to generate calibration information relating to a calibration status of at least one part of the irradiation device based on the position of the calibration pattern. For example, it is possible to derive whether the calibration pattern is generated in the correct position in the determination region or whether a deviation between a (defined) nominal position and an (determined) actual position of the calibration pattern occurs. Dependent on whether the calibration pattern is generated in the correct position, a corresponding calibration status can be determined or, in other words, calibration information relating to the calibration status of the at least one part of the irradiation device, for example the first or the second irradiation unit can be generated.

Of course, it is possible to calibrate the at least one part of the irradiation device dependent on the calibration information, in particular dependent on the calibration status of the at least one part of the irradiation device, if necessary. For example, it is possible to calibrate various beam guiding units and/or irradiation units or the like, if a deviation between a predefined nominal position of the calibration pattern and a determined position of the calibration pattern in the determination region is determined.

According to an embodiment of the inventive method, a first calibration pattern may be generated via the first energy beam guided by the first beam guiding unit to at least one first position in the build plane and at least one first parameter of the calibration pattern may be determined in the at least one first position via the first determination unit assigned to the first beam guiding unit, and a second calibration pattern may be generated via the second energy beam guided via the second beam guiding unit to at least one second position in the build plane and at least one second parameter of the second calibration pattern may be determined in the at least one second position via the first determination unit.

Therefore, it is possible to generate a first calibration pattern and a second calibration pattern, wherein for the generation of the first calibration pattern the first energy beam is used which is guided via the first beam guiding unit of the first irradiation unit. The first calibration pattern is generated in the first position in the build plane, wherein at least one first parameter of the calibration pattern, for example the position of the first calibration pattern, may be determined via the first determination unit. The first determination unit may be, as described before, an on-axis determination unit, which is assigned to the first irradiation unit. Additionally, a second calibration pattern may be generated via the second energy beam that is guided via the second beam guiding unit of the second irradiation unit. The second calibration pattern is generated in at least one second position in the build plane, wherein at least one second parameter of the second calibration pattern, for example the second position of the second calibration pattern, may be determined via the first determination unit, as well.

In other words, it is possible to determine the at least one parameter of the first calibration pattern and the second calibration pattern, i.e. the first and the second parameter, via the first determination unit, which is assigned to the first irradiation unit. Thus, it is possible to generate a relation between the first irradiation unit and the second irradiation unit, as both calibration patterns generated via the first irradiation unit and the second irradiation unit are analyzed via the same determination unit or the at least one parameter of the calibration patterns is determined, respectively, via the first determination unit. Hence, the at least one parameter of the calibration patterns, for example the position of the calibration patterns are both derived or determined, respectively, with the same determination unit and therefore, a direct relation between the actual position of the calibration patterns is established between the at least two irradiation units. In other words, both parameters may be determined in the same coordinate system and the coordinate systems of the individual irradiation units may be related via the described determination process.

The inventive method may further involve that the first calibration pattern is generated via the first energy beam guided via the first beam guiding unit to at least one first position in the build plane and at least one first parameter of the calibration pattern is determined in the at least one first position via the second determination unit that is assigned to the second beam guiding unit, and a second calibration pattern is generated via the second energy beam guided via the second beam guiding unit to at least one second position in the build plane and at least one second parameter of the second calibration pattern is determined in the at least one second position via the second determination unit. Therefore, the second determination unit can also be used to determine the at least one first parameter and the at least one second parameter of the calibration patterns generated via the at least two irradiation units, in particular an on-axis determination unit assigned to the second irradiation unit. It is further possible to provide only one determination unit which is assigned to either the first irradiation unit or the second irradiation unit.

Hence, it is possible to determine the at least one first parameter and the at least one second parameter of the first calibration pattern and the second calibration pattern, wherein the first parameter and the second parameter may, inter alia, relate to the position of the first calibration pattern or the second calibration pattern or may relate to a relative position, in particular a distance between the first calibration pattern and the second calibration pattern.

Further, it is possible to identify differences between the first and the second parameter of the at least one first and the at least one second calibration pattern being generated in the at least one first and the at least one second position, in particular with the at least one first position matching the at least one second position. Thus, it is possible to generate the first calibration pattern and the second calibration pattern in defined positions, i.e. the first position and the second position, to determine the first and second parameter. For example, the first position may match the second position, wherein the first calibration pattern and the second calibration pattern are generated in the same (nominal) position. It is possible to determine, whether the first calibration pattern and the second calibration pattern are properly generated in the corresponding position, i.e. in the first position and in the second position, in particular whether the two calibration patterns that are to be generated in the same position, deviate from that nominal position. Hence, the (actual) first and second position can be determined and compared with the nominal position(s).

An identified difference between the first and the second parameter may be compensated by adjusting at least one of the at least two irradiation units, in particular at least one of the at least two beam guiding units. Thus, a calibration can be performed by adjusting at least one of the two irradiation units in order to compensate the identified difference between the first and the second parameter. For example, the first calibration pattern and/or the second calibration pattern may not be generated in the nominal position, for example it is possible that the first position and/or the second position deviate from their nominal position. Hence, it is possible to adjust the first and/or the second irradiation unit to compensate the difference and to calibrate the irradiation device. Therefore, it can be assured that after the irradiation device is calibrated each calibration pattern can be generated in the nominal position in that the difference between the first parameter and the second parameter is compensated, in particular if the first parameter and the second parameter are the same, for example relating to the same position in which the first calibration pattern and the second calibration pattern are generated. The individual calibration patterns may be generated simultaneously or successively, for instance.

According to another embodiment of the inventive method, a determination region of the build plane may be imaged via one of the at least two beam guiding units to the corresponding determination unit, in particular onto a determination element of the determination unit. Thus, one of the at least two beam guiding units that are assigned to the first irradiation unit or the second irradiation unit are used to image a determination region (or at least one part of the determination region) of the build plane to the corresponding determination unit. For example, the first beam guiding unit can be used to image a determination region of the build plane to the first determination unit. Of course, it is also possible to use the second determination unit, wherein the second beam guiding unit of the second irradiation unit is used to image the determination region of the build plane to the second determination unit. As determination element, inter alia, any position sensitive optical element, such as an arrangement of photo diodes or a PSD-sensor (CCD, CMOS) can be used to image the determination region.

The determination region can be moved, in particular scanned, between at least two determination positions in the build plane via the at least one beam guiding unit. The beam guiding unit may, inter alia, be built as beam guiding unit comprising a movable mirror element via which the determination region can be imaged to the determination unit. By moving the beam guiding unit or the mirror element of the beam guiding unit, respectively, the determination region can be scanned over the build plane, wherein, in other words, dependent on the position of the beam guiding unit, a different part of the build plane can be imaged as determination region to the determination unit.

Further, the calibration pattern can be generated in a defined position in the build plane via the energy beam guided via the at least one other beam guiding unit. Dependent on which beam guiding unit is used to image the determination region to the corresponding determination unit, the at least one other beam guiding unit is used to guide the corresponding energy beam to the build plane in order to generate a calibration pattern. For example, if the first beam guiding unit is used to image the determination region to the first determination unit, i.e. scan the determination region across the build plane, the second beam guiding unit can be used to guide the second energy beam to the build plane to generate a calibration pattern in the defined position in the build plane or vice versa. Subsequently, the determination position of the determination region in which the calibration pattern is imaged to the determination unit can be determined, as described before.

Thus, it is possible to determine whether differences between the first irradiation unit and the second irradiation unit are present, for example the coordinate systems used via the first irradiation unit and the second irradiation unit match or whether there is a difference between the two coordinate systems. Further, it is possible to compare the settings of the at least two beam guiding units, for example, determine whether the calibration pattern can be imaged to the determination unit in the defined position with the determination region being scanned or guided to that defined position in the build plane. In other words, if both coordinate systems are aligned/match, the calibration pattern will be imaged to the determination unit, if the corresponding beam guiding unit positions the determination region in the defined position. By scanning the determination region over the build plane, the calibration pattern that is generated in the build plane will be imaged to the determination unit. Hence, even if the two irradiation units are not aligned or are not properly calibrated, the position in which the the calibration pattern is imaged to the determination unit can be found. Thus, it is possible to derive whether a difference between the two nominal positions or the two actual positions occurs and the difference can be compensated.

In particular, it is possible that the determination region is scanned over the build plane and in each position an image is stored or a value is stored for that position. For example amplitude values of radiation that is emitted from the build plane, for example a reflected part of the energy beam. Thus, a maximum of the radiation can be found, wherein it is possible to generate a map from the individual determination results.

It is also possible that a defined determination region which is positioned in a defined determination position in the build plane is imaged to the at least one determination unit, in particular onto a determination element of the at least one determination unit, and that the energy beam that is assigned to the other irradiation unit is guided in a predefined pattern across the build plane via the at least one other beam guiding unit and that the defined determination position of the determination region can be determined. In other words, instead of scanning the determination region over the build plane, it is possible to keep the determination region in a static defined determination position in the build plane. Hence, the region of the build plane in which the defined determination region is positioned, i.e. the region around the defined determination position, is imaged to the determination unit. Simultaneously, the energy beam is guided via the at least one other beam guiding unit across the build plane. Hence, it is possible to determine the actual position of the energy beam in which the calibration pattern is generated in the defined position in the determination region.

For example, the defined determination region may be imaged to the first determination unit via the first beam guiding unit of the first irradiation unit, wherein the second energy beam may be guided across the build plane, in particular scanned across the build plane, via the second beam guiding unit of the second irradiation unit. It is possible to determine the actual position of the second energy beam in which the second energy beam or the second calibration pattern generated via the second energy beam, is properly imaged to the first determination unit. Accordingly, differences between the actual position and the nominal position, in particular the actual position of the second energy beam and the defined determination position can be derived. Self-evidently, it is also possible to use the second determination unit assigned to the second irradiation unit, i.e. image the defined determination region via the second beam guiding unit and generate the calibration pattern using the first beam guiding unit guiding the first energy beam.

According to another embodiment of the inventive method, at least one calibration body may be arranged in the process chamber of the apparatus, in particular in the build plane, which calibration body is adapted to actively or passively generate a calibration pattern, and wherein the generated calibration pattern can be imaged to the at least one determination unit via the corresponding beam guiding unit. Thus, a calibration body may be arranged in the process chamber, for example in the build plane. The calibration body may be adapted to actively or passively generate a calibration pattern. The calibration pattern may therefore, be generated actively, for example by emission of radiation from at least one radiation source provided with the calibration body, such as a light emitting diode or the like. It is also possible to generate the calibration pattern passively, for example by providing a defined structure via the calibration body that is adapted to reflect at least one part of the energy beam or that radiation is generated upon irradiation with the energy beam, for instance.

The generated calibration pattern can then be imaged to the at least one determination unit via the corresponding beam guiding unit, for example imaged the first and/or the second determination unit assigned to the first and/or second irradiation unit. Thus, it is possible to generate a relation between the first and the second beam guiding unit, in particular the first and the second irradiation unit and it is also possible to generate an absolute measure, for example whether a nominal position in the build plane is met via the first and the second beam guiding unit, as predefined via the calibration body.

According to this embodiment, it is further possible to image the generated calibration pattern via the first beam guiding unit to the first determination unit and determining a first parameter of the calibration pattern and imaging the generated calibration pattern via the second beam guiding unit to the second determination unit and determining a second parameter of the calibration pattern. Hence, if both irradiation units are provided with determination units, it is possible to guide the calibration pattern via the corresponding beam guiding unit to each of the determination units. Therefore, it is possible to determine whether the first beam guiding unit and the second beam guiding unit image the generated calibration pattern from the same actual position to the corresponding determination unit. Thus, it is possible to identify a difference between the first and the second parameter, for example relating to the actual position of the calibration pattern based on the two coordinate systems of the first irradiation unit and the second irradiation unit.

Preferably, the deviation or an identified deviation between the at least two beam guiding units can be compensated based on an identified difference between the first and the second parameter. For example, if the calibration pattern is imaged to the first irradiation unit with the first beam guiding unit in a first determination position, as described via the first parameter, and the calibration pattern is simultaneously imaged to the second determination unit via the second beam guiding unit from a second position as described via the second parameter, a difference between the first parameter and the second parameter, in particular the first position and the second position, can be identified. Accordingly, the irradiation device may be calibrated by compensating the difference between the first parameter and the second parameter, in particular assuring that both beam guiding units are adapted to guide the energy beam to the same nominal position. Or in other words, it is possible to determine whether the first energy beam and the second energy beam are incident in the same actual position, if the two beam guiding units are controlled to generate the calibration patterns in the same nominal position.

The inventive method may further be improved by generating the calibration pattern on the calibration body upon irradiation with an energy beam, wherein the calibration body comprises a defined calibration structure, in particular comprising at least two regions with different reflection properties. By providing the defined calibration structure it is possible to generate calibration patterns on the calibration body upon irradiation with an energy beam. For example, it is possible that the calibration structure comprises different reflection properties than the rest of the calibration body in that it can be identified whether an energy beam being guided across the calibration body is incident on the calibration structure or is incident on the calibration body in a position different from the defined calibration structure. Thus, it is possible to use both energy beams on the calibration body, in particular scan both energy beams along the calibration structure to identify whether the calibration pattern is properly generated via both energy beams or whether a deviation between the desired calibration pattern and the calibration pattern generated upon irradiation with the individual energy beams occurs. As described before, an identified difference between a desired calibration pattern and an actual calibration pattern can be compensated.

The calibration body may preferably be coupled with at least one positioning means inside the process chamber, which positioning means arranged in a defined mounting position. By providing a defined mounting position, in particular arranging the calibration body in a defined mounting position, an absolute measure can be generated to ensure that the calibration patterns that are generated via the first and/or the second irradiation unit can be generated in nominal positions relative to the process chamber, in particular the build plane. In other words, the positioning means make sure that the calibration structure of the calibration body is arranged in a defined position relative to the build plane, wherein it is further ensured that the calibration patterns are generated in the defined nominal position, if the first energy beam and the second energy beam being scanned over the calibration body generate the desired calibration pattern properly.

According to another preferred embodiment of the inventive method, at least one calibration pattern can be imaged to an optical determination element of the at least one determination unit, in particular a spatially resolving optical element, for example a PSD-sensor, preferably a camera.

Besides, the invention relates to an irradiation device comprising at least two irradiation units, wherein a first irradiation unit is adapted to generate at least one first energy beam and guide the first energy beam via a first beam guiding unit in a guiding region of a build plane, wherein a second irradiation unit is adapted to generate at least one second energy beam and guide the second energy beam via a second beam guiding unit in a guiding region of a build plane, wherein at least one irradiation unit is adapted to guide one of the at least two energy beams via the corresponding irradiation unit to a determination region, preferably a part of a build plane, for generating a calibration pattern, wherein the at least one other beam guiding unit is adapted to image at least one part of the determination region to an on-axis determination unit of the at least one other irradiation unit, wherein the determination unit is adapted to determine a position of the calibration pattern in the determination region and to generate calibration information relating to a calibration status of at least one part of the irradiation device based on the position of the calibration pattern.

Further, the invention relates to an apparatus for additively manufacturing three-dimensional objects by means of successive layerwise selective irradiation and consolidation of layers of a build material which can be consolidated by means of an energy beam, comprising an irradiation device with at least two irradiation units, wherein a first irradiation unit is adapted to generate at least one first energy beam and guide the first energy beam via a first beam guiding unit in a guiding region of a build plane, wherein a second irradiation unit is adapted to generate at least one second energy beam and guide the second energy beam via a second beam guiding unit in a guiding region of a build plane, wherein at least one irradiation unit is adapted to guide one of the at least two energy beams via the corresponding irradiation unit to a determination region, preferably a part of a build plane, for generating a calibration pattern, wherein the at least one other beam guiding unit is adapted to image at least one part of the determination region to an on-axis determination unit of the at least one other irradiation unit, wherein the determination unit is adapted to determine a position of the calibration pattern in the determination region and to generate calibration information relating to a calibration status of at least one part of the irradiation device based on the position of the calibration pattern.

Self-evidently, the method for calibrating an irradiation device can be used to calibrate the inventive irradiation device, preferably as part of the inventive apparatus.

Exemplary embodiments of the invention are described with reference to the FIG. The FIG. are schematic diagrams, wherein.

Figure 1:
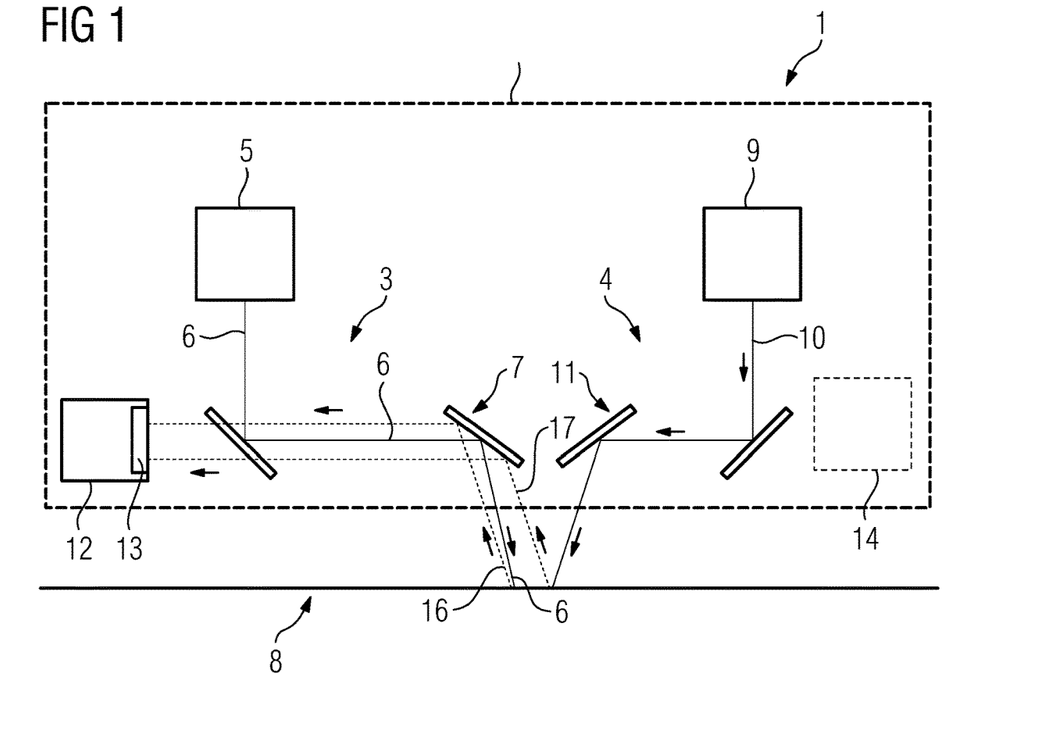
FIG. 1 shows an inventive apparatus according to a first embodiment.

FIG. 1 shows an apparatus 1 for additively manufacturing three-dimensional objects (not shown) by means of successive layerwise selective irradiation and consolidation of layers of a build material. The apparatus 1 comprises an irradiation device 2 with a first irradiation unit 3 and a second irradiation unit 4. Of course, the irradiation device 2 may comprise an arbitrary number of irradiation units 3, 4, wherein in this exemplary embodiment only two irradiation units 3, 4 are depicted.

The first irradiation unit 3 comprises a first energy source 5, for example a laser source, which irradiation unit 3 is adapted to generate a first energy beam 6 and guide the first energy beam 6 via a first beam guiding unit 7 across a build plane 8 of the apparatus 1. Of course, any other arbitrary plane than the build plane 8 can be used for the calibration method, as will be described below. The second irradiation unit 4 comprises a second energy source 9, for example a laser source, which is adapted to generate a second energy beam 10 that can be guided via a second beam guiding unit 11 across the build plane 8.

In particular, both irradiation units 3, 4 are adapted to guide the energy beams 6, 10 in respective guiding regions in the build plane 8, wherein the guiding regions, in particular the first guiding region and the second guiding region, overlap or abut each other, for instance. In this exemplary embodiment it is possible to guide each energy beam 6, 10 across the entire build plane 8, wherein it is also possible that the build plane 8 is subdivided into the first guiding region and the second guiding region that may at least partially overlap.

The first irradiation unit 3 comprises a first determination unit 12 or the first determination unit 12 is assigned to the first irradiation unit 3, respectively. The first determination unit 12 is arranged on-axis to the energy beam 6, as can be derived from the FIG. 1n other words, radiation that is emitted from the build plane 8, for example at least one reflected part of the energy beam 6 can be guided via the first beam guiding unit 7 to the first determination unit 12, for example to a determination element 13, in particular a PSD-sensor. It is also possible that the second irradiation unit 4 has a determination unit, in particular a second determination unit 14, wherein for the method for calibration the irradiation device 2 according to the first embodiment, a second determination unit 14 is not necessary. Self-evidently, it is also possible to use the second determination unit 14 instead of the first determination unit 12.

Figure 2:
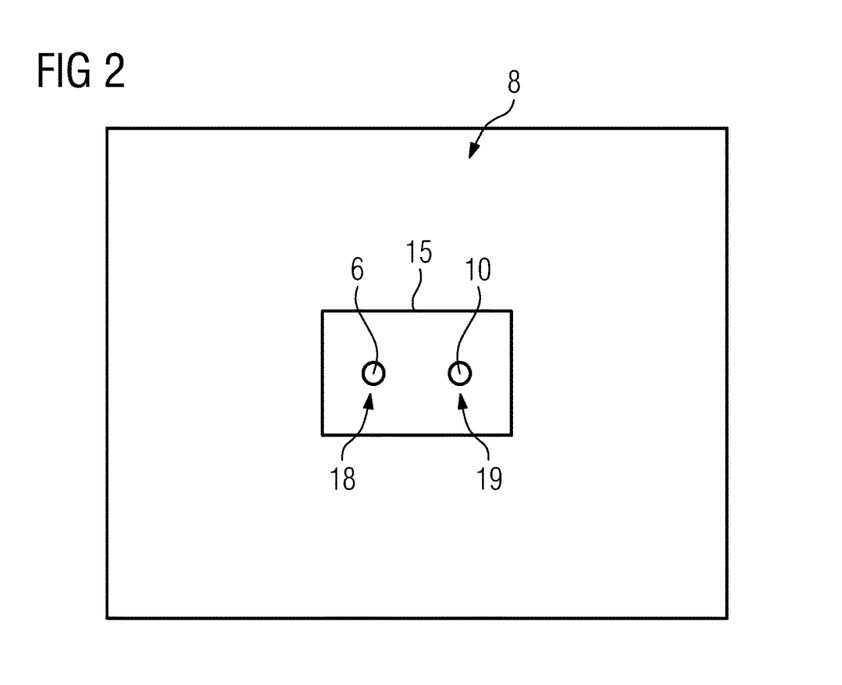
FIG. 2 shows a top view on a build plane of the apparatus from FIG. 1.

FIG. 2 shows a top view on the build plane 8, as depicted in FIG. 1. Hence, a determination region 15 that generally defines the region of the build plane 8 that is imaged via the first beam guiding unit 7 to the first determination unit 12, in particular onto the determination element 13 of the first determination unit 12. Further, spots of the energy beams 6, 10 lie in the determination region 15 and can therefore, be imaged to the first determination unit 12 via the first beam guiding unit 7, as described before. In FIG. 1, radiation 16, 17 is depicted that is emitted from the build plane 8, for example a part of the energy beam 6, 10 that is reflected at the build plane 8 or thermal radiation that is generated due to the irradiation of material arranged in the build plane 8.

Thus, it is possible to generate a first calibration pattern 18 and a second calibration pattern 19 in a first position and a second position in the build plane 8, in particular in the determination region 15. The first calibration pattern 18 and the second calibration pattern 19 are imaged to the first determination unit 12, and it is possible to determine the first parameter and the second parameter of the calibration patterns 18, 19. For example, the first parameter and the second parameter may relate to the individual positions of the first calibration pattern 18 and the second calibration pattern 19 or to a relative position, in particular a distance between the first calibration pattern 18 and the second calibration pattern 19. Hence, if the first calibration pattern 18 and the second calibration pattern 19, in the simplest case spots of the energy beams 6, 10, are to be generated in the same position, it can be determined via the first determination unit 12, whether the first calibration pattern 18 and the second calibration pattern 19 are generated in the nominal position (same position) or whether a deviation/difference occurs. In particular, it can be derived whether both spots of the energy beam 6, 10 match in the build plane.

If a difference between the first parameter and the second parameter or a nominal parameter and the corresponding first and second parameter, is determined, the respective irradiation unit 3, 4 can be adjusted accordingly to compensate the difference. By using the first determination unit 12 to determine the second parameter of the second energy beam 10, in particular the second calibration pattern 19, it is possible to establish a relation between both irradiation units 3, 4, in particular to make sure that the coordinate systems of the individual irradiation units 3, 4 are aligned and match.

Figure 3:
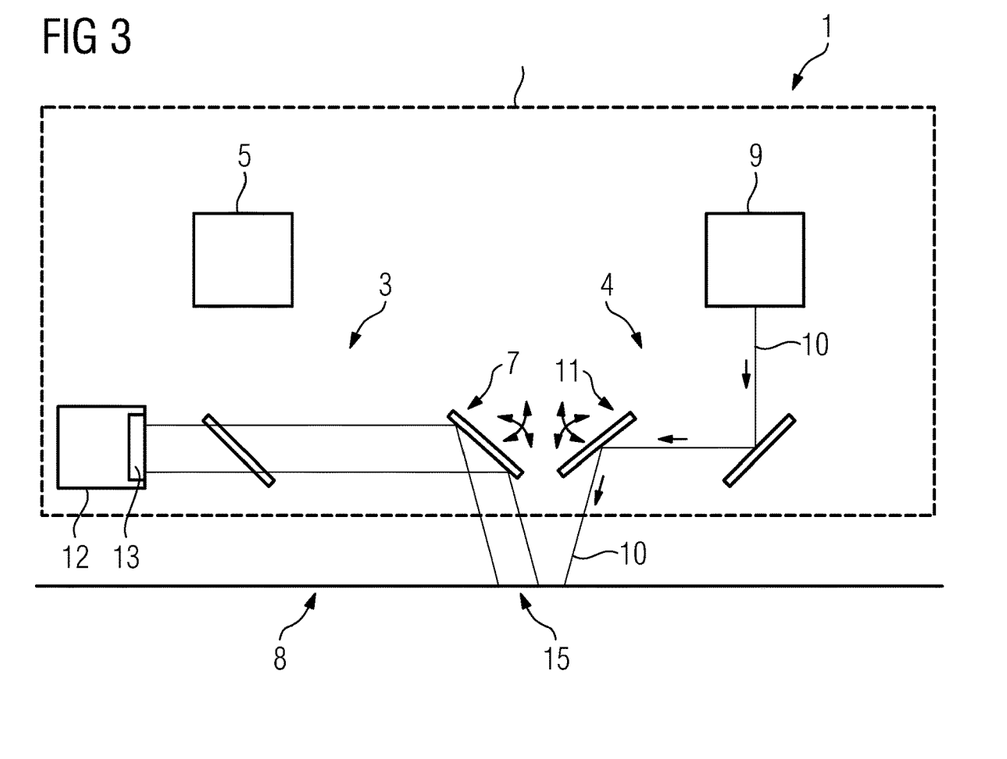
FIG. 3 shows an inventive apparatus according to a second and third embodiment.
Figure 4:
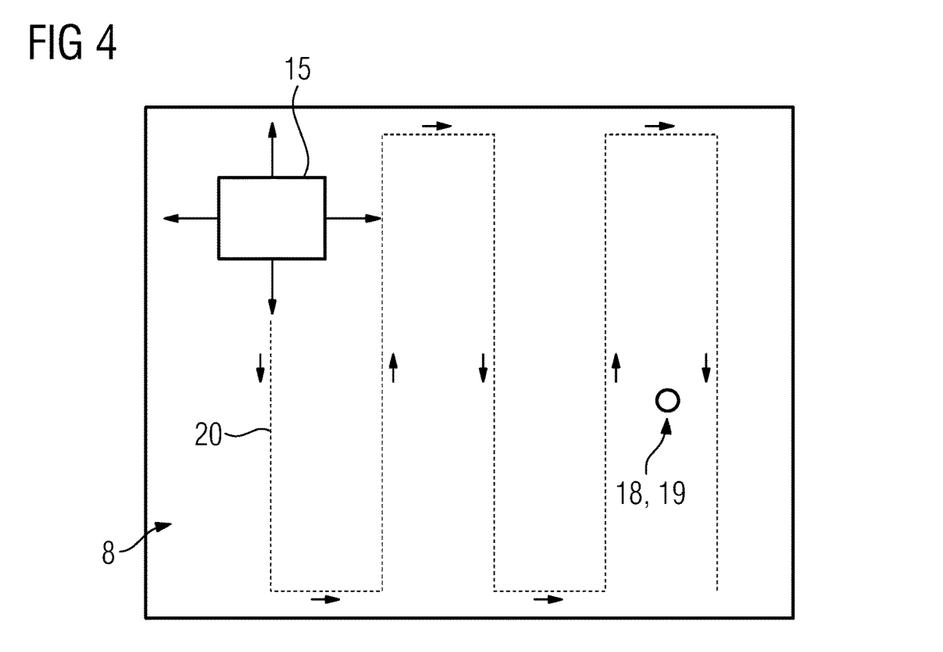
FIG. 4 shows a top view on a build plane of the apparatus from FIG. 3 according to the second embodiment.
Figure 5:
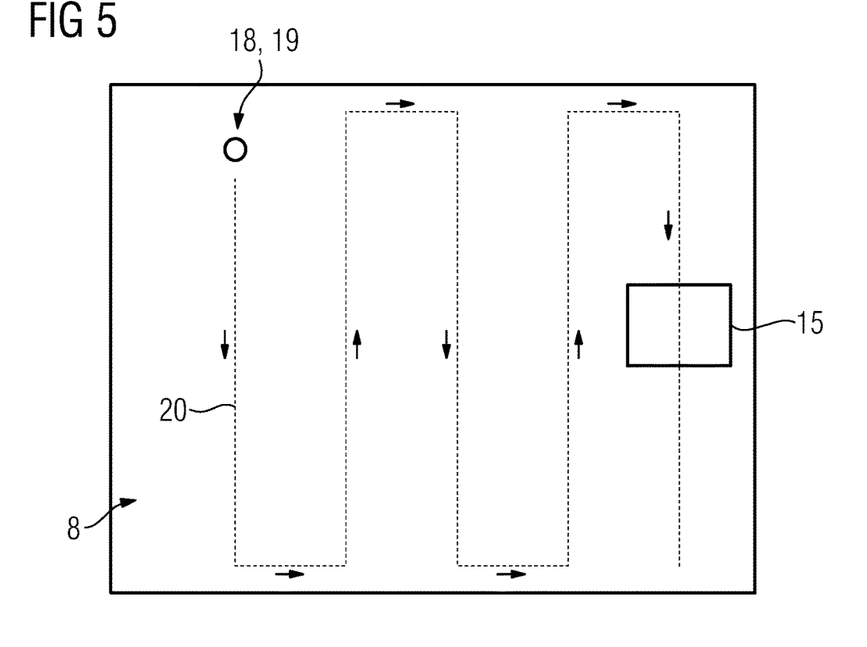
FIG. 5 shows a top view on a build plane of the apparatus from FIG. 3 according to the third embodiment.

FIG. 3 shows the inventive apparatus 1 according to a second and third embodiment, wherein FIG. 4 shows the build plane 8 in top view according to the second embodiment and FIG. 5 shows the build plane 8 in top view according to the third embodiment. According to the second and third embodiment, it is possible to generate a calibration pattern 18, 19 with only one energy beam 6, 10 and to generate a relative movement between the determination region 15 and the calibration pattern 18, 19. In general, it is not of importance whether the calibration pattern 18, 19 is guided across the build plane and the determination region 15 is kept in a static position or whether the calibration pattern 18, 19 is kept in a static position and the determination region 15 is scanned across the build plane 8. In the exemplary embodiment that is depicted in FIG. 4, the determination region 15 is moved across the build plane 8, wherein via the second energy beam 10 the second calibration pattern 19 is generated in a fixed position. Hence, the determination region of 15 can be scanned across the build plane 8 in a predefined pattern, as indicated via arrow 20.

Hence, it is possible to generate a map of the build plane 8 indicating the intensity of radiation 16, 17 emitted from the build plane 8. Therefore, it is possible to find the position in which the second calibration pattern 19 is generated via the second irradiation unit 4, in which position a maximum of the radiation 16, 17 is detected in the center of the determination region 15.

Besides, it is also possible to generate the relative movement between the determination region 15 and the calibration pattern 18, 19 by moving the calibration pattern 18, 19, as indicated in FIG. 5. Thus, the energy beam 6, 10 may be moved in the predefined pattern (or any other arbitrary pattern) across the build plane 8, as indicated via arrow 20, wherein the determination region 15 is held in a static position. Of course, it is possible to generate the calibration pattern 18, 19 via each of the energy beam 6, 10, wherein if the first calibration pattern 18 is generated via the first energy beam 6 guided via the first beam guiding unit 7, the second determination unit 14 has to be used to image the determination region 15, whereas if the second energy beam 10 is used to generate a second calibration pattern 19 by guiding the second energy beam 10 via the second beam guiding unit 11 across the build plane 8 following the predefined pattern as indicated via arrow 20, the determination region 15 is imaged via the first beam guiding unit 7 to the first determination unit 12. Thus, it is possible to establish a direct relation between both irradiation units 3, 4 and to ensure that the irradiation device 2 is calibrated.

Figure 6:
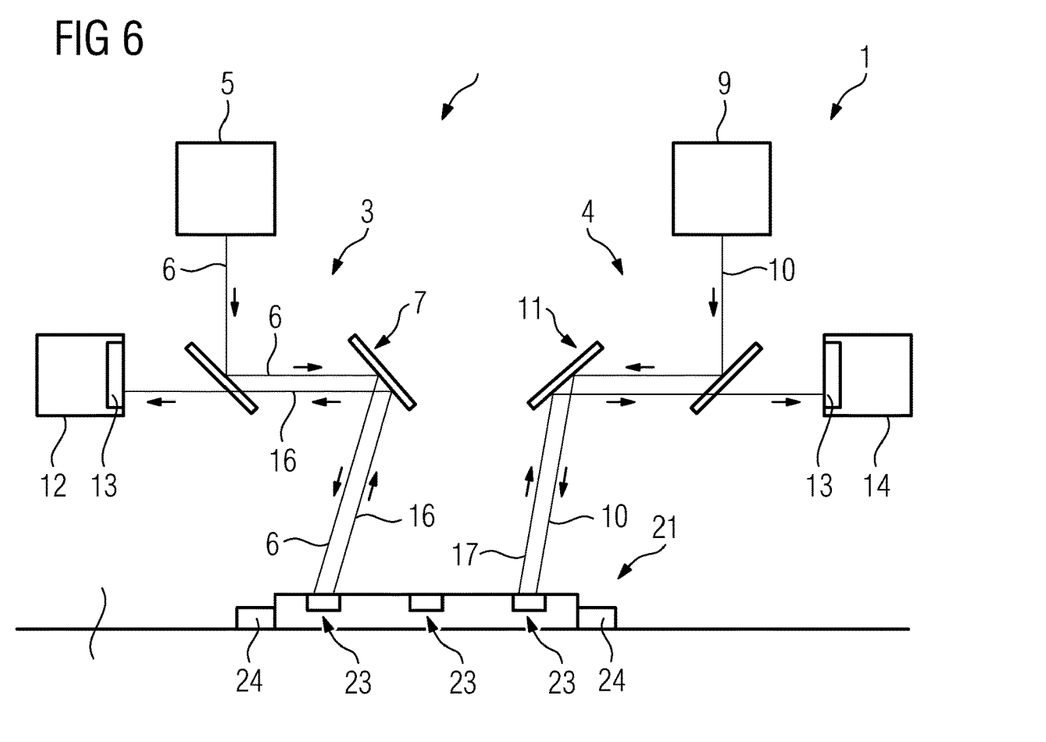
FIG. 6 shows an inventive apparatus according to a fourth embodiment.
Figure 7:
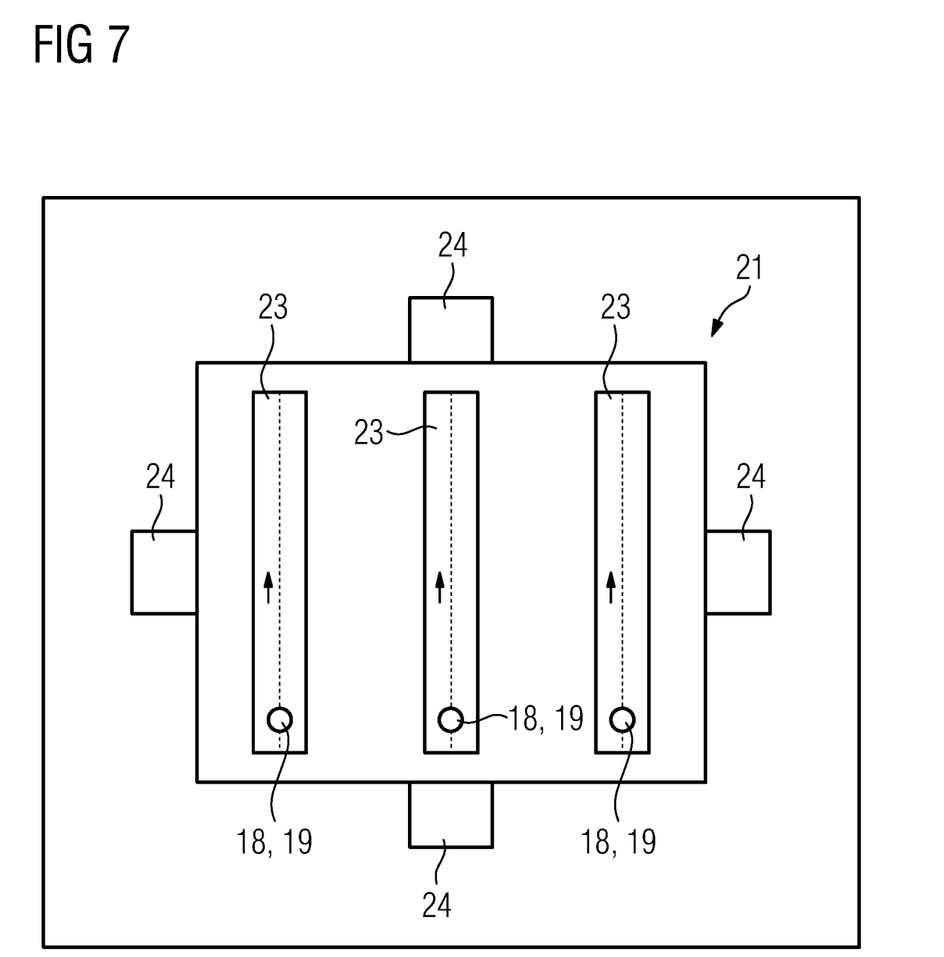
FIG. 7 shows a top view on a build plane of the apparatus from FIG. 6.

FIG. 6 shows the inventive apparatus 1 according to a fourth embodiment, wherein same numerals are used for same parts. In this exemplary embodiment a calibration body 21 is arranged in the process chamber 22 of the apparatus 1, i.e. the chamber in which the additive manufacturing process is performed in a regular mode of operation. The calibration body 21, for example a cuboid of metal or glass or ceramic, comprises a calibration structure 23, wherein the calibration body 21 is adapted to emit radiation 16, 17 upon irradiation with the energy beams 6, 10. In this exemplary embodiment the calibration structure 23 comprises a different reflectivity than the rest of the calibration body 21, for example by building the calibration structure 23 from a different material or having a different surface, e.g. polished or brushed, than the rest of the calibration body 21. Hence, it is possible to guide the calibration pattern 18, 19 across the calibration structure 23, wherein radiation 16, 17 emitted from the calibration structure 23, for example a reflected part of the energy beams 6, 10, can be guided via the corresponding beam guiding unit 7, 11 to the determination units 12, 14.

In particular, it is possible to determine with the first determination unit 12, whether the second energy beam 10 properly irradiates the calibration structure 23 and it is possible to derive via the second determination unit 14 whether the first energy beam 6 properly irradiates the calibration structure 23. Thus, a direct relation between both irradiation units 3, 4 can be established using the calibration body 21, wherein the irradiation process performed by the first irradiation unit 3 can be observed with the second determination unit 14 and the second irradiation unit 4 can be observed via the first determination unit 12.

Hence, only if both irradiation units 3, 4 are properly calibrated, it is possible to detect the radiation 16, 17 via the corresponding determination unit 12, 14. If a deviation occurs in the control of the beam guiding unit 7, 11 either the corresponding energy beam 6, 10 is not incident on the calibration structure 23 or the corresponding determination region 15 that is guided across the calibration body 21 via the other beam guiding unit 7, 11 is not in the correct position. Hence, it can be assured that both irradiation units 3, 4 are properly calibrated or, if a deviation occurs, it is possible to calibrate the corresponding irradiation unit 3, 4.

Further, FIG. 6 depicts that positioning means 24 are provided that assure that the calibration body 21 is arranged in a defined mounting position. Thus, it is possible to mount the calibration body 21 in the defined mounting position, wherein an absolute measure is generated that defines, for example, the individual position of the calibration structure 23 relative to the build plane 8. Thus, it is not only possible to generate a relation between the first irradiation unit 3 and the second irradiation unit 4, but it is also possible to generate a relation between the coordinate system of the apparatus 1 and the coordinate systems of the irradiation units 3, 4, for example machine axes of the apparatus 1.

Of course, all features, details and advantages described with respect to the individual embodiments can arbitrarily be transferred, exchanged and combined. Self-evidently, the inventive method may be performed on the inventive apparatus, preferably for calibrating the inventive irradiation device.

The invention claimed is:

1. A method of calibrating an irradiation device of an apparatus for additively manufacturing three-dimensional objects, the method comprising:
   generating a first calibration pattern on a first determination region of a build plane, the first calibration pattern generated with a first energy beam emitted by a first irradiation unit of the irradiation device;
   generating a second calibration pattern on a second determination region of the build plane, the second calibration pattern generated with a second energy beam emitted by a second irradiation unit of the irradiation device;
   collecting, via an optical sensor, a first image of the first calibration pattern on at least one part of the first determination region of the build plane and a second image of the second calibration pattern on at least one part of the second determination region of the build plane, the first image generated by a second on-axis determination unit of the second irradiation unit, the second image generated by a first on-axis determination unit of the first irradiation unit, wherein at least one reflected part of the first energy beam emitted from the build plane is guided via a first beam guiding unit to a determination element of the first on-axis determination unit;

determining calibration information comprising a first position of the first calibration pattern within the first determination region on the basis of the first image, and a second position of the second calibration pattern within the second determination region on the basis of the second image; and determining a calibration status of at least one of the first irradiation unit and the second irradiation unit, the calibration status determined based at least in part on the calibration information.

2. The method of claim 1, comprising:
adjusting at least one of the first irradiation unit and the second irradiation unit based at least in part on the calibration status.

3. The method of claim 1, comprising:
determining a first parameter of the first calibration pattern and a second parameter of the second calibration pattern based at least in part on the image data; and
determining the calibration status based at least in part on the first parameter of the first calibration pattern and the second parameter of the second calibration pattern.

4. The method of claim 3, wherein the first parameter comprises the first position of the first calibration pattern within the first determination region, and wherein the second parameter comprises the second position of the second calibration pattern within the second determination region.

5. The method of claim 4, wherein determining the calibration status comprises at least one of: determining a first calibration parameter associated with the first irradiation unit based at least in part on the first position of the first calibration pattern, and determining a second calibration parameter associated with the second irradiation unit based at least in part on the second position of the second calibration pattern.

6. The method of claim 3, comprising:
determining a difference between the first parameter and the second parameter; and
adjusting at least one of the first irradiation unit and the second irradiation unit based at least in part on the difference.

7. The method of claim 3, wherein adjusting the first irradiation unit comprises adjusting a first beam guiding unit defining a portion of the first irradiation unit, and wherein adjusting the second irradiation unit comprises adjusting a second beam guiding unit defining a portion of the second irradiation unit.

8. The method of claim 3, comprising at least one of:
guiding the first energy beam to the first determination region with a first beam guiding unit defining a portion of the first irradiation unit, and determining the first parameter of the first calibration pattern with the first calibration pattern located at the first position of the first determination region, and determining the calibration status of the first irradiation unit based at least in part on the image data comprising the first calibration pattern generated by the second on-axis determination unit; and/or
guiding the second energy beam to the second determination region with a second beam guiding unit defining a portion of the second irradiation unit, and determining the second parameter of the second calibration pattern with the second calibration pattern located at the second position of the second determination region, and determining the calibration status of the second irradiation unit based at least in part on the image data comprising the second calibration pattern generated by the first on-axis determination unit.

9. The method of claim 1, comprising:
moving, with a first beam guiding unit defining a portion of the first irradiation unit, the first determination region to a plurality of first determination positions of the build plane, generating, with the first energy beam emitted by the first irradiation unit, the first calibration pattern for respective ones of the plurality of first determination positions, and generating, with the second on-axis determination unit of the second irradiation unit, image data for respective ones of the plurality of first determination positions; and/or
moving, with a second beam guiding unit defining a portion of the second irradiation unit, the second determination region to a plurality of second determination positions of the build plane, generating, with the second energy beam emitted by the second irradiation unit, the second calibration pattern for respective ones of the plurality of second determination positions, and generating, with the first on-axis determination unit of the first irradiation unit, image data for respective ones of the plurality of second determination positions.

10. The method of claim 9, comprising:
determining the respective ones of the plurality of first determination positions based at least in part on the image data for the respective ones of the plurality of first determination positions; and/or
determining the respective ones of the plurality of second determination positions based at least in part on the image data for the respective ones of the plurality of second determination positions.

11. The method of claim 9, comprising:
moving the first energy beam in a predefined pattern across the build plane; and/or
moving the second energy beam in a predefined pattern across the build plane.

12. The method of claim 1, comprising:
compensating a deviation between the first irradiation unit and the second irradiation unit based at least in part on a difference between a first parameter of the first calibration pattern and a second parameter of the second calibration pattern determined based at least in part on the image data.

13. The method of claim 1, comprising:
wherein the first determination region of the build plane comprises a first calibration structure having a first reflection property, and wherein the second determination region of the build plane comprises a second calibration structure having a second reflection property, wherein the first calibration structure and the second calibration structure are respectively attached to, and/or respectively define, a portion of a calibration body.

14. The method of claim 13, wherein the calibration body is coupled to a positioning mechanism, the positioning mechanism configured to position the calibration body in a defined mounting position.

15. The method of claim 1, wherein the first irradiation unit and the second irradiation unit respectively define a portion of an irradiation device.

16. The method of claim 1, wherein the first determination region and the second determination region overlap or abut one another.

17. The method of claim 1, wherein the first irradiation unit is configured to guide the first energy beam within a first guiding region of the build plane, and wherein the second irradiation unit is configured to guide the second energy beam within a second guiding region of the build plane, wherein the first guiding region and the second guiding region overlap or abut one another.

18. The method of claim 1, wherein the first on-axis determination unit comprises a first camera, and wherein the second on-axis determination unit comprises a second camera.

19. The method of claim 1, wherein the first calibration pattern and the second calibration pattern are generated simultaneously.

20. The method of claim 1, wherein the first calibration pattern and the second calibration pattern are generated successively.

* * * * *